United States Patent Office 2,899,318
Patented Aug. 11, 1959

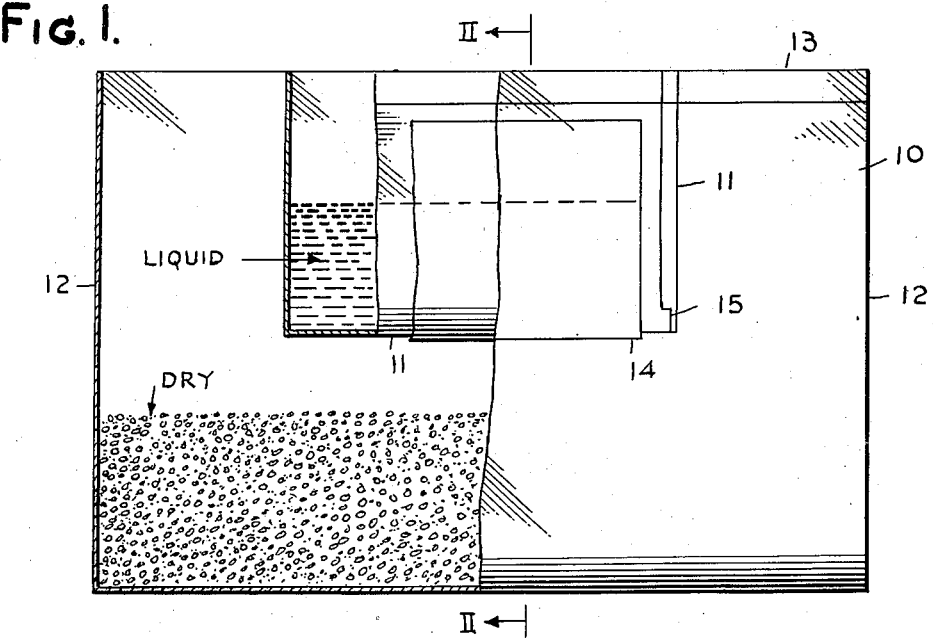
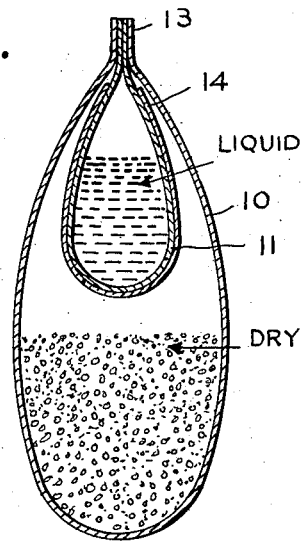
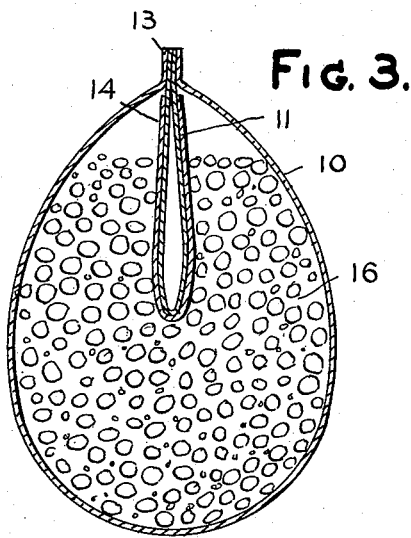

2,899,318

AUTOMATIC FOAMING UNIT

Florren E. Long, Fredericktown, Ohio, assignor to Continental Can Company, Inc., New York, N.Y., a corporation of New York Application August 31, 1956, Serial No. 607,484

11 Claims. (Cl. 99—180)

This invention relates to a unit capable of producing a foamed commodity, and to the commodities produced thereby.

Heretofore, certain commodities, such as cake icings, meringue etc., have required laborious beating and whipping operations to produce a foamed product which will not harden but which will remain soft and creamy.

The present invention has for its principal object the production of a foamed product without mechanical beating.

It is also an object of this invention to produce a package containing measured quantities of ingredients, which when mixed together will produce a foamed product.

The present invention employs the use of a weak acid and of a material containing a substance that will evolve carbon dioxide when brought into contact with the weak acid.

The various features of novelty which characterize this invention are pointed out with particularity in the claims annexed to, and forming part of this specification. For a better understanding of the special objects obtained by its use, reference should be had to the drawings and descriptive matter, in which is illustrated the preferred embodiment of this invention.

Of the drawings:

Figure 1 is a plan view, partially in section of the automatic foaming unit.

Fig. 2 is a sectional view on line II—II of Fig. 1.

Fig. 3 is a sectional view similar to Fig. 2, showing the completed foamed product.

The preferred embodiment of this invention comprises an outer envelope 10 and an inner envelope 11, shown in Fig. 1. The outer envelope is made by folding a piece of transparent pliable film back upon itself and heat sealing the edges 12, 12 to form a rectangular pouch or container, which may be heat sealed across the top 13, after the contents have been placed therein. The inner envelope 11 is made of a water proof thermoplastic film such as cellophane or polyethylene laminate. This is heat sealed along the edges to form a water proof pouch and after the liquid contents have been placed therein is sealed across the top. This is placed within the outer pouch and may be sealed into the top thereof, when the opening is closed during the heat sealing operation.

The inner pouch 11 may have a paper backing 14 thereon for display purposes, or this pouch may be formed of a laminate where the printing is directly applied to one sheet, such as the cellophane in the laminate structure.

A foamed product may be produced by placing the dry constituents in the envelope 10, as shown in Fig. 1, and the liquid constituents in the envelope 11. When it is desired to produce a foam the inner envelope is ruptured at a point such as 15, where the seal has been narrowed and therefore weakened. This allows the liquid to come into contact with the dry material contained in the bottom of the container or pouch 10. The liquid may contain an alkaline material such as sodium bicarbonate. A solid acid, such as cream of tartar is contained within the dry material. When these contact each other carbon dioxide is generated and the foam 16 forms within the pouch 10, as shown in Fig. 3. After this has been formed, or during its formation, a corner of the pouch 10 may be removed and the contents thereof spread on to any object to which it is desired to apply it.

This particular type of container has found use in merchandising a cake icing mixture wherein:

2 egg whites dried
1¼ cups sugar
Dash of salt
3 grams cream of tartar are placed as the dry ingredients in the bottom of pouch 10

1½ t. of light corn syrup
1 t. vanilla
2 grams sodium bicarbonate
⅓ cup cold water are placed in the pouch 11.

This, when mixed together as described above, may be thoroughly kneaded, within the flexible pouch 10. A corner of the bag is then removed by cutting, as with a pair of scissors, and the light fluffy cake icing contents thereof may be forced from the bag by squeezing the outer envelope.

While in the above example the bicarbonate is dissolved in the liquid and a solid acid is added to the dry ingredients, it can be readily understood that this could be reversed and the carbonate could be a portion of the dry ingredient while the acid could be dissolved in the liquid medium.

In a second modification of this invention the inner envelope may be dispensed with and the dry ingredients, having the bicarbonate and the acid as solid constituents thereof, are maintained in an anhydrous condition by the envelope. When it is desired to prepare a foam, a corner of the envelope is removed, and a measured amount of water introduced, and due to the kneading action applied to the envelope a uniform foam having the desired consistency, is obtained. This is then available for use as described above. The basic requirement in making the best quality foam is to have either the acid or base phase of the formula or both dispersed throughout the product to be foamed. This permits the gas to be evolved throughout the mixture rather than in a localized area, resulting in a thoroughly mixed and foamed solid.

In the above example the egg and water portion can be varied to give various degrees of thickness and texture in the finally foamed product.

Such products as cake icing, described above and meringue, have been foamed by mechanical beating or whipping air into the mixture. Recent techniques involve the use of gas systems under pressure in rigid containers to effect a foam. Products of this type are the "Reddi-Whip" cream and shaving lathers. All of these techniques may be avoided by the use of the apparatus and method as described above.

While in accordance with the provisions of the statute, the best forms of embodiment of this invention now known have been illustrated and described, it will be apparent to those skilled in the art, that changes may be made in the forms of the apparatus disclosed and the method described, without departing from the spirit of this invention as set forth in the appended claims, and in some cases features of this invention may be used to advantage without a corresponding use of other features.

What is claimed is:

1. A two compartment container, the first compartment being formed from polyethylene cellophane laminate having a paper facing on the exterior surface thereof and containing a bicarbonate solution, the second compartment containing the first compartment being composed of cellophane, the contents thereof having an acid incorporated therein which reacts with the bicarbonate solution of the first mentioned container to form a foam when the contents of the first container are admixed with the contents of the second container.

2. A two-compartment container for holding a food product, said container comprising a bag having first and second compartments one within the other, said first compartment comprising a sheet of flexible material folded back on itself and heat sealed down three edges thereof and containing one ingredient of the food product, said second compartment, smaller than the first compartment, comprising a second sheet of material folded back on itself and heat sealed down the three edges thereof and containing a second ingredient of the food product, the top seal of said first compartment including the top seal of said second compartment, and said first and second compartments having therein substances effective upon being brought into admixture one with the other upon rupturing of the second compartment to produce a foamed product.

3. A bag as claimed in claim 2, wherein said smaller compartment is made from a sheet of water proof thermoplastic material.

4. A bag as claimed in claim 2, wherein said smaller compartment is made from two-ply polyethylene laminate and contains a liquid ingredient.

5. A bag as claimed in claim 2, wherein said smaller compartment is made from a sheet of two-ply cellophane polyethylene laminate and said larger compartment is made from a sheet of cellophane.

6. A bag as claimed in claim 2, wherein said smaller compartment is composed of a cellophane polyethylene laminate on a paper facing on the exterior surface thereof.

7. A method of making a foamed food product, which comprises the steps of forming a two compartment bag, one compartment within the other, the first compartment containing a liquid ingredient, the second compartment containing a dry ingredient capable of forming a foam when mixed with said first ingredient, the first compartment being contained within the second compartment; rupturing said second compartment and admixing said liquid ingredient with said dry ingredient.

8. A method as set forth in claim 7, wherein said liquid material is of an acid nature and said dry material contains a compound capable of releasing carbon dioxide when reacted with the said acid material.

9. A method as set forth in claim 7, wherein said liquid material contains sodium bicarbonate and the said dry material contains cream of tartar.

10. A method for the production of a foamed product which comprises introducing into a durable, flexible, transparent outer envelope, a granular material containing cream of tartar within said outer envelope, a second envelope of water-proof material containing a liquid, said liquid having dissolved therein sodium bicarbonate, manipulating the outer envelope to effect rupture of the inner envelope and bring about the contact of the bicarbonate containing liquid with the cream of tartar containing granular material.

11. A method for the production of a foamed cake icing, which comprises introducing into a durable, flexible, transparent outer envelope cream of tartar, dried egg whites, salt and sugar, and a second envelope of durable water-proof material containing vanilla, corn syrup and sodium bicarbonate solution, manipulating the outer envelope to effect rupture of the inner envelope and bring about contact of the contents of both envelopes to produce a foamed cake icing.

References Cited in the file of this patent

UNITED STATES PATENTS

| Number | Name | Date |
|---|---|---|
| 892,074 | Obici | June 30, 1908 |
| 2,037,175 | Northcross | Apr. 14, 1936 |
| 2,442,091 | Maun et al. | May 25, 1948 |
| 2,469,521 | Rohdin | May 10, 1949 |
| 2,607,693 | Latham et al. | Aug. 19, 1952 |
| 2,682,472 | Wagner | June 29, 1954 |
| 2,694,641 | Atwood et al. | Nov. 16, 1954 |
| 2,721,552 | Nosik | Oct. 25, 1955 |
| 2,728,671 | Young et al. | Dec. 27, 1955 |
| 2,741,559 | Banowitz | Apr. 10, 1956 |
| 2,756,874 | Erickson et al. | July 31, 1956 |
| 2,824,010 | Pedersen | Feb. 18, 1958 |

OTHER REFERENCES

Modern Packaging, March 1954, pages 203 to 208.
Modern Packaging, July 1955, page 81.